United States Patent [19]

Smith et al.

[11] 4,158,201

[45] Jun. 12, 1979

[54] FLAT ELECTRO OPTIC DISPLAY PANEL AND METHOD OF USING SAME

[75] Inventors: Michael R. Smith, Thousand Oaks; Richard H. Burns, Glendale, both of Calif.

[73] Assignee: The Singer Company, New York, N.Y.

[21] Appl. No.: 843,192

[22] Filed: Oct. 18, 1977

[51] Int. Cl.² ............................................. G06K 15/18
[52] U.S. Cl. .................... 340/783; 340/798; 350/150; 365/109; 365/117; 365/145
[58] Field of Search ................... 350/150; 340/324 R, 340/324 M, 324 FE; 365/109, 117, 145

[56] References Cited

U.S. PATENT DOCUMENTS

| | | | |
|---|---|---|---|
| 3,449,038 | 6/1969 | Scarrott | 350/150 |
| 3,531,182 | 9/1970 | Land et al. | 350/150 |
| 3,609,002 | 9/1971 | Fraser et al. | 350/150 |
| 3,612,656 | 10/1971 | Maldonado et al. | 350/150 X |
| 3,666,666 | 5/1972 | Haertling | 350/150 X |
| 3,701,121 | 10/1972 | Fraser | 350/150 |
| 3,702,215 | 11/1972 | Cummins | 350/150 |
| 3,744,875 | 7/1973 | Haertling et al. | 350/150 |
| 3,940,201 | 2/1976 | Micheron et al. | 365/117 X |

Primary Examiner—David L. Trafton
Attorney, Agent, or Firm—Charles R. Lewis

[57] ABSTRACT

A flat PLZT plate is utilized to form erasable images thereon which images may be projected or viewed directly. One embodiment includes electrically conductive islands on one side of the PLZT plate which are surrounded by and electrically isolated from an electrically conductive grid pattern. The portion of the PLZT plate located between an island and the surrounding portion of the grid pattern constitutes a pixel or image forming element. By grounding the grid pattern and applying an electrical charge to selected ones of the islands, an image can be formed on the PLZT plate which can be viewed directly or projected by means of polarized light. In order to form the erasable images on the PLZT plate by optical means, the grid pattern and islands are coated with a layer of photoconductive material upon which a layer of a transparent conductor is coated. By applying a potential to the transparent conductor and exposing the coated PLZT plate to an optical image, those islands subjected to the light radiation receive an electrical charge thereby forming a birefringence image in the PLZT plate.

25 Claims, 17 Drawing Figures

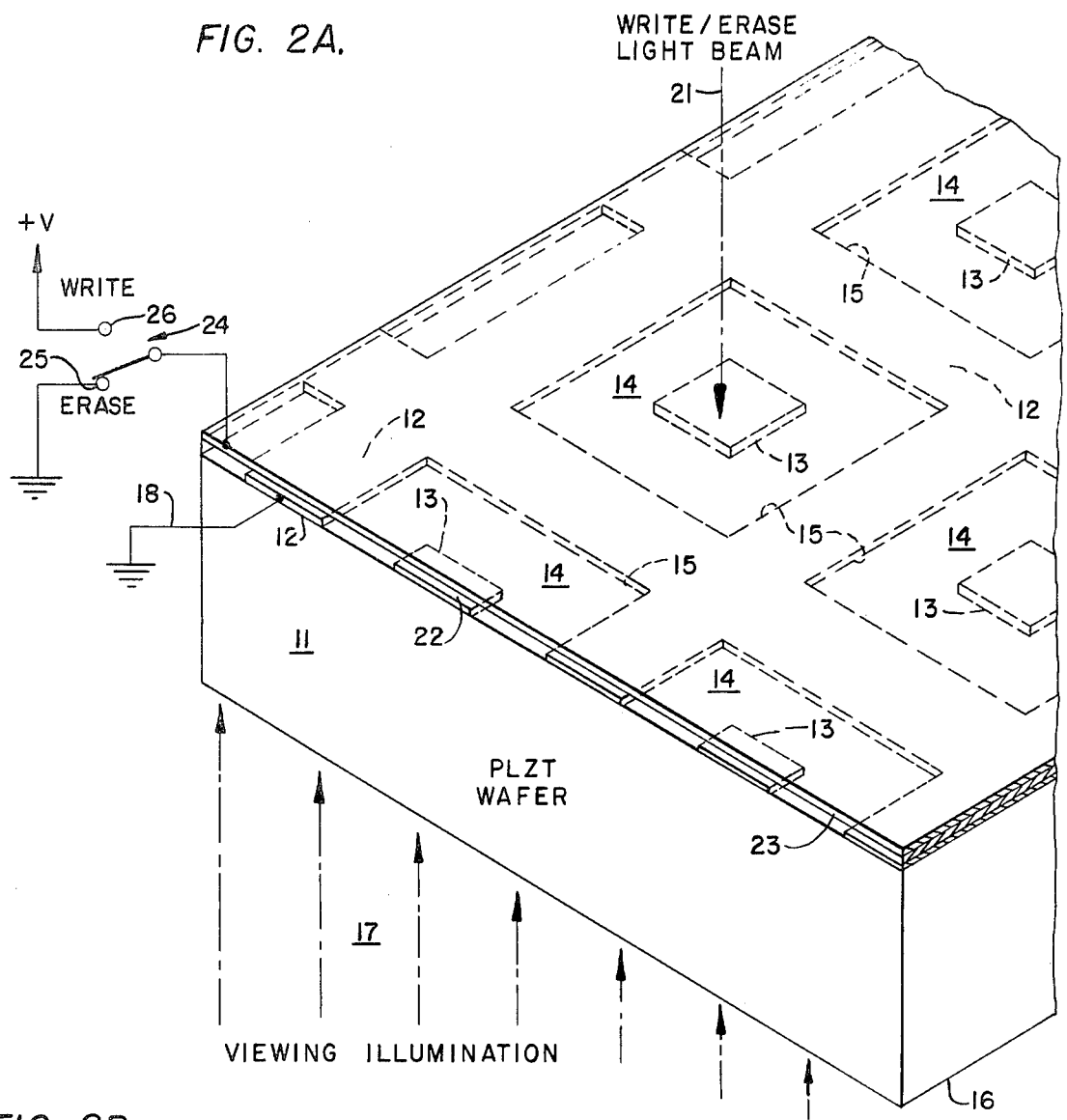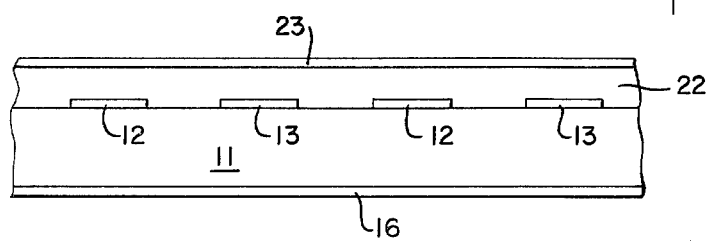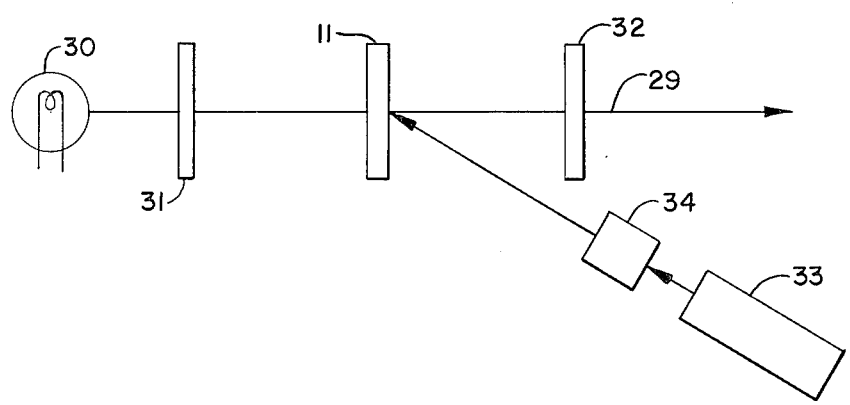

FLAT ELECTRO OPTIC DISPLAY PANEL AND METHOD OF USING SAME

BACKGROUND OF THE INVENTION

This invention relates to a display panel having erasable images thereon which can be projected or viewed directly. More particularly this invention relates to flat PLZT display panels wherein one side of the PLZT panel contains metallized islands within a grounded metallized grid pattern. The PLZT material located between an island and the grid pattern defines a pixel or image forming element which is utilized to form an image on the PLZT plate by means of birefringence.

U.S. Pat. No. 3,666,666 discloses a fine grain, polycrystalline, ferroelectric, ceramic material that exhibits birefringence, i.e., upon the application of an external electric field in the plane of the material, the material decreases its index of refraction along the electric field vector to produce two orthogonal axes with an index of refraction difference. The birefringence retards the phase of linearly polarized light and thus can be used to vary the transmission through a suitably oriented polarization analyzer. The specific compositions of ferroelectric ceramic materials which do not exhibit remnant polarization and which are characterized as a slim loop material, are best suited for operation with surface electrode pattern induced birefringence. The ferroelectric ceramic in the U.S. Pat. No. 3,666,666 contains lanthanum doped lead zirconate-lead titanate (hereinafter referred to as PLZT material). Due to its unique optical characteristics, PLZT material has been used to perform various functions in the field of optics. For example, U.S. Pat. No. 3,612,656 discloses a PLZT plate device which is utilized as an optical shutter, i.e., the PLZT plate device is either opened or closed to the transmission of polarized light. U.S. Pat. No. 3,531,182 discloses the use of a plurality of crossed conductors to control the birefringence of discrete areas of a plate of PLZT material to provide an array of light shutters that may function as information storage areas. U.S. Pat. No. 3,702,215 discloses a system wherein a bare PLZT plate is scanned by an electron beam in a vacuum to produce an erasable image that may be projected. In addition to the disadvantage of being operable only in a vacuum, the system disclosed in the U.S. Pat. No. 3,702,215 has the added disadvantage that the bare PLZT device does not contain surface electrode patterns or image forming elements on the surface of the PLZT plate, and therefore does not form birefringence images with the slim loop PLZT material.

One object of this invention is to provide a flat display panel that utilizes a PLZT plate on which erasable images can be formed for direct viewing or projection.

Another object of this invention is to provide a flat display panel that utilizes a PLZT plate having a plurality of metallized islands thereon which are surrounded by a metallized grid pattern to enable erasable images to be formed on the PLZT plate which may be viewed directly or projected.

Still another object of this invention is to provide a flat display panel that utilizes a PLZT plate having a plurality of electrically conductive islands thereon which are surrounded by an electrically conductive grid pattern that enables erasable images to be formed on the PLZT plate either electrically or optically.

A further object of this invention is to provide methods of forming and erasing images on a PLZT plate having metallized islands deposited thereon and surrounded by a grounded metallized grid pattern.

SUMMARY OF THE INVENTION

Briefly described, a flat display panel according to the present invention comprises a PLZT plate having first and second parallel surfaces. An electrically conductive coating having a plurality of openings therein is located on one of said parallel surfaces forming a grid pattern. Islands of electrically conductive material electrically isolated from the conductive grid pattern are disposed within the openings. By applying an electrical charge to selected ones of the islands, and thereby creating an electrical potential with respect to the electrically conductive grid pattern a birerefringent image can be formed on the PLZT plate. The image so formed can be visualized by polarized radiation and can be erased by enabling the charged islands to discharge to the potential of the grid.

Images can be optically formed on the PLZT plate by covering the islands and electrically conductive grid coating with a photoconductor upon which a transparent conductor is formed. By applying a potential to the transparent conductor, with respect to the conductive grid coating, and exposing the coated surface of the PLZT plate to a pattern of radiation, those islands upon which light impinges become charged through the photoconductor, thereby, creating areas of birefringence which can be illuminated with polarized light to visualize the image for projection or direct viewing. The image thus formed on the PLZT plate may be readily erased by means that enable the charged islands to discharge to the surrounding grid potential.

BRIEF DESCRIPTION OF DRAWINGS

The present invention will be clearly understood from consideration of the following detailed description taken in conjunction with the following drawings wherein like reference numerals indicate like or corresponding parts throughout the several views and wherein:

FIGS. 2A and 2B taken together illustrate another embodiment of the present invention which enables erasable images to be optically formed on a PLZT plate;

FIG. 3 illustrates an optical system which may be utilized with the PLZT plate of this invention to form and view the erasable images;

DESCRIPTION OF THE PREFERRED EMBODIMENT

Figure 1A:
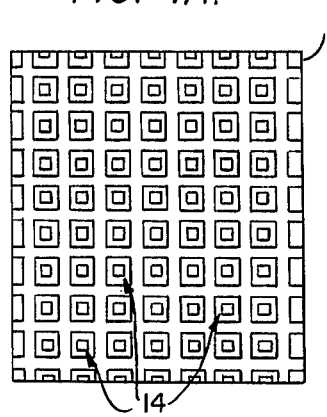
FIGS. 1A, 1B and 1C taken together illustrate one embodiment of the present invention which enables erasable images to be electrically formed on a PLZT plate.
Figure 1B:
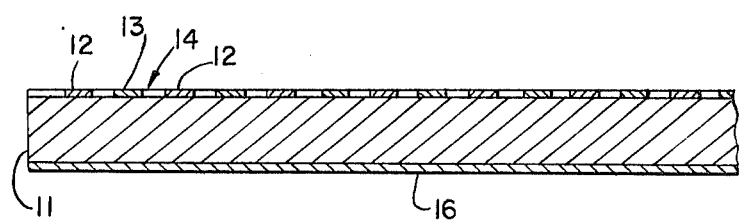
Figure 1C:
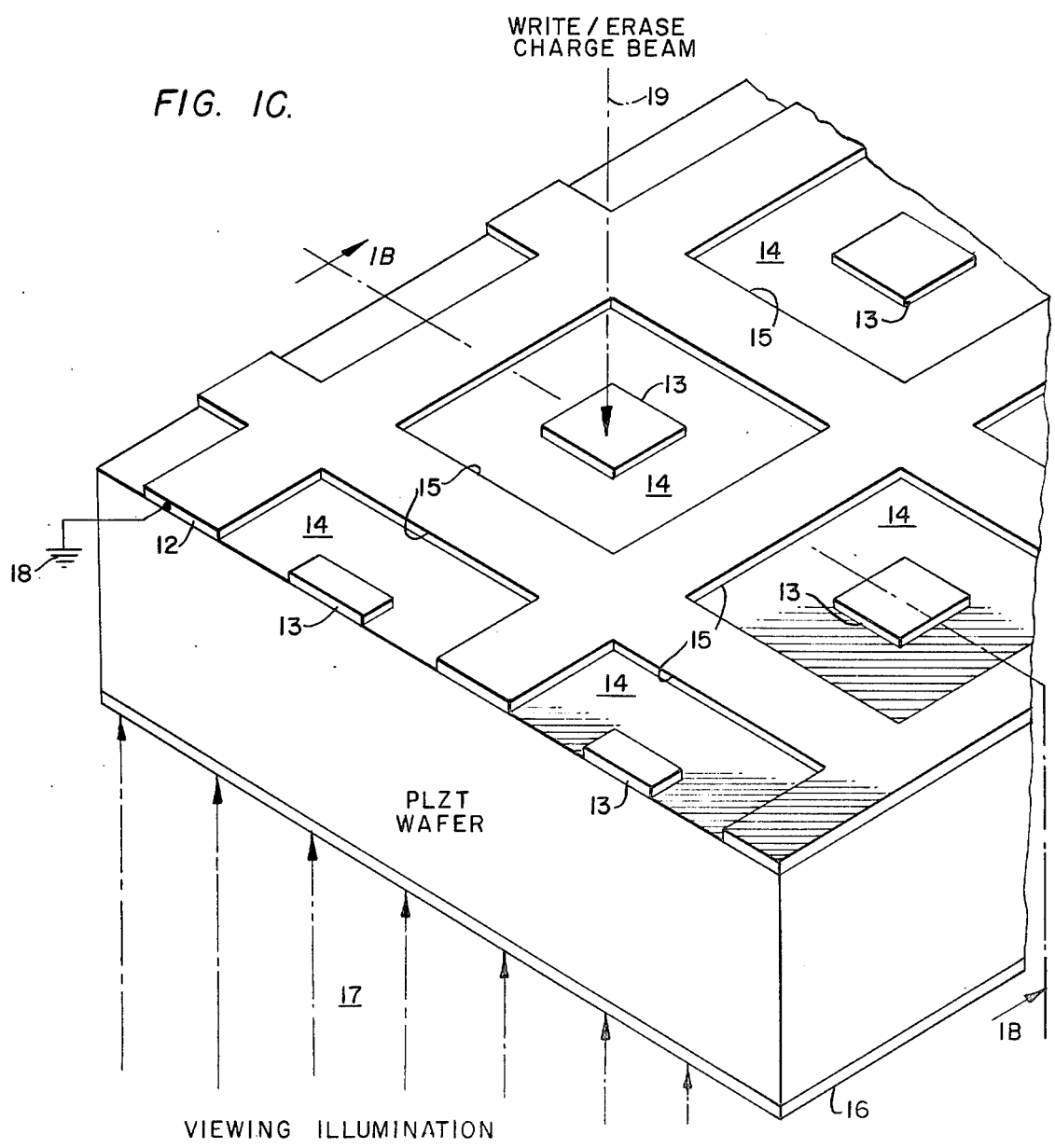
Figure 4A:
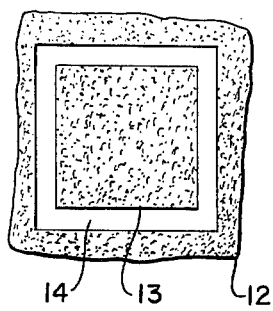
FIGS. 4A through 4I illustrate a few of the very many geometric configurations which may be utilized in forming pixel or image forming elements on the PLZT plate in accordance with the present invention.
Figure 4B:
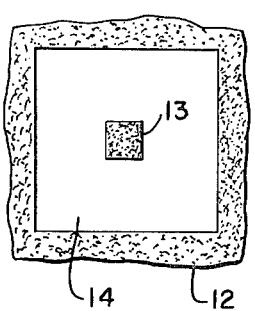
Figure 4C:
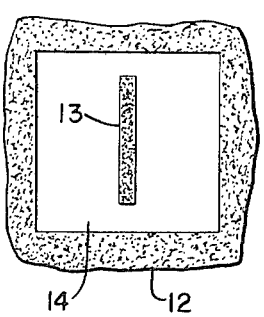
Figure 4D:
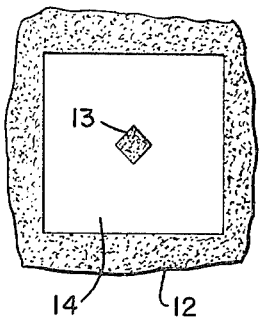
Figure 4E:
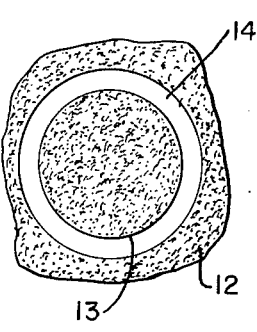
Figure 4F:
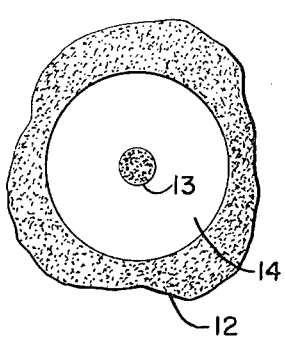
Figure 4G:
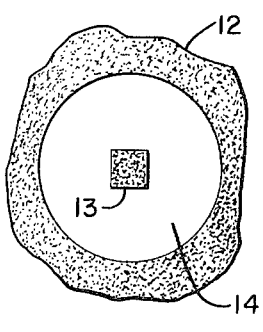
Figure 4H:
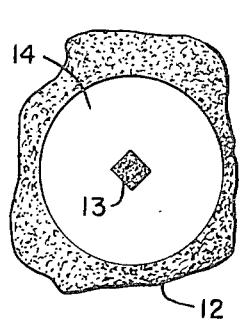
Figure 4I:
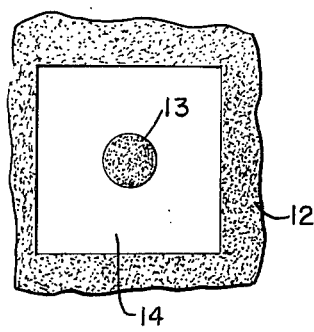

Referring now to FIGS. 1A, 1B and 1C it is seen that an electro-optical display panel in accordance with the present invention includes a flat PLZT plate 11 which has a plurality of pixels 14 or image forming elements 14 formed on one side thereof. Only a small portion of the entire PLZT plate 11 is shown in FIG. 1A. A coating of an electrically conductive material 12 on one side of the PLZT plate 11 contains a plurality of openings 15 therein to form a grid pattern. Located within the opening 15 but electrically isolated from the electrically conducting coating 12 are electrically conductive islands 13. The uncoated, exposed portion of the PLZT plate 11 surface located between the islands 13 and the electrically conductive coating 12 constitute the pixels 14 or image forming elements. The display panel 11 may include on the opposite surface thereof a transparent conductor 16.

In accordance with one embodiment of the invention which was constructed, the grid pattern 12 and the islands 13 constituted vacuum deposited chromium of about 1,000 angstroms thickness. The transparent conductor 16 can be a thin deposited layer of indium oxide or tin oxide or a combination thereof or a very thin layer of gold (100 angstroms) having a surface resistivity of approximately 14 ohms per square unit. Good image resolution was obtained by utilizing square islands 13 having a dimension of 0.001 inch on each side. Each island 13 was centrally located within the openings 15 with each opening being 0.003 of an inch on each side. In this embodiment the width of the grid pattern of electrically conductive material 12 was 0.001 of an inch. In other words the resolution elements 14 are approximately 0.003 of an inch square on a 0.004 of an inch grid spacing. The grid pattern 12 and islands 13 were deposited on a 0.01 inch thick wafer of PLZT material which included 65% by weight of lead zirconate and 35% by weight of lead titanate with 9% by weight of lanthanum being doped into the wafer.

An image is formed in the opaque PLZT plate 11 by inducing birefringence in portions of the PLZT plate 11 so as to affect the transmission of polarized light. This is accomplished by grounding 18 the grid pattern 12 and applying a positive or negative potential to the islands 13 on the portion of the PLZT plate 11 which is to be imaged. The resulting electric field between the charged island 13 and the grid pattern 12 will induce birefringence in the adjacent PLZT material and will after the polarization state of transmitted radiation. The induced image will become visible upon viewing or projecting with incident polarized light through a polarization analyzer. The electrical potential is created by applying an electrical charge to the selected islands 13 by any number of well known means. For example the PLZT plate 11 can be scanned with an electron beam 19 in a manner as disclosed in U.S. Pat. No. 3,702,215 the contents of which are incorporated herein by reference. Alternatively the islands 13 may be charged by a corona discharge by placing a sharply pointed electrode connected to a source of high potential in the vicinity of the island, by physically contacting the islands 13 with a probe (not shown) connected to a source of electrical potential, by a jet of charged particles, or any other suitable means. The potential to which the islands 13 become charged can be controlled by connecting a reference potential (not shown) to the patterned grid 12 with the ground terminal of the reference potential being connected to the transparent conductor 16. When a charge is applied to the selected islands 13 the potential resulting thereon will not exceed the value of the reference potential appearing on the grid pattern 12. Once formed, the image may be visualized by transmitting with polarized light 17 through the PLZT plate and by viewing through a polarization analyzer in a manner as is described hereinbelow.

An image formed on the PLZT plate 11 can be selectively erased by applying an electrical charge of opposite polarity to the charged islands 13, causing to the potential difference between the grid 12 and the islands 13 to be eliminated. Alternatively, an image can be selectively erased by contacting the charged islands 13 with an electrical contact probe (not shown) which is connected to the grid 12. Rather than selectively erasing only a part of an image, the entire image can be erased at one time by wiping the surface of the PLZT plate 11 having the grid pattern 12 and islands 13 thereon with a conductive fluid which will enable the potential difference between the grid 12 and the islands 13 to be eliminated. The same result is achieved by exposing the PLZT plate 11 to ultraviolet radiation which will form change carriers that discharge the charged islands 13 to the grid potential.

A second embodiment of the present invention which enables images to be formed on the PLZT plate 11 by optical means is illustrated in FIGS. 2A and 2B. As shown this embodiment also includes the grounded 18 transparent conductor 16 on the side of the PLZT plate 11 remote from the islands 13 and grid pattern 12. A transparent photoconductive layer 22 covers the islands 13 and grid pattern 12 which photoconductor surface 22 is covered by a transparent conductor 23. As in the embodiment described in conjunction with FIGS. 1A, 1B and 1C, an image is formed in the PLZT plate 11 illustrated in FIG. 2 by selected areas of the PLZT plate 11 corresponding to the desired image being induced to alter the transmission of polarized light. When forming an image, the grid pattern 12 and transparent conductor 16 are usually grounded and the transparent conductor 23 is connected to a source of potential $+V$ by way of the switch 24 contact 26. Light directed onto the transparent conductor 23 above an island 13 will cause at least part of the potential on the transparent conductor 23 to be transferred to the island 13 as a result of the increased conductivity of the photoconductor between the island 13 and the top electrode 23. The potential difference between the island 13 and the surrounding grounded 18 grid pattern 12 will cause the PLZT material 11 therebetween to exhibit birefringence. The necessary image forming light can be applied to the PLZT plate 11 in the desired pattern by means of a scanning laser beam 21, alternatively by contacting the coated surface of the PLZT wafer 11 with a negative print (not shown) and exposing the entire assembly to light, by focusing an image on the PLZT wafer by means of a standard projection lens, or by any other suitable means. The image thus formed can be made visible by the use of polarized light 17 in a manner as discussed hereinbelow.

An image recorded on the PLZT wafer of FIG. 2 is selectively erased by grounding the grid pattern 12 and also the transparent conductor 23 by way of the contact 25 of the switch 24 and selectively applying image forming light to the areas of the image which are to be erased. The light will cause the islands 13 located therebelow to discharge to ground potential. The entire image can be erased by subjecting the entire coated surface of the PLZT wafer to image forming light. The transparent conductor 23 can be formed from the same material as the transparent conductor 16. The photoconductive layer 22 can be formed by coating the PLZT plate 11 with a solution of PVK doped with TNF or by sputtering a layer of cadmium zinc sulfide onto the surface of the PLZT plate 11, or by other methods for producing photoconductive thin films which are known in the art.

The image formed in the device of FIG. 2 is projected or directly viewed by applying the polarized viewing illumination 17 to the side of the PLZT plate 11 remote from the islands 13 and grid pattern 12 and by viewing through a polarization analyzer, not shown. When so illuminated the opaque metallic islands 13 will shadow the photoconductor 22 and largely prevent the illumination light 17 from activating the photoconductor and discharging the charged islands 13. Additionally, since image forming light, such as a laser beam is much more intense than the illuminating light 17 the illuminating light 17 will have a much lesser effect upon the charged islands 13.

An optical system which may be utilized with the PLZT display panels 11 of the present invention to directly view or to project the images contained therein is schematically illustrated in FIG. 3 as containing a source of unpolarized illumination light 30 that is propogated in the direction of the arrow 29. A light polarizer 31 transmits only that plane of polarization of the illumination light which makes an angle of 45° with both the X and Y axis of the rectangular grid pattern 12 thereof. The illumination light then passes thru the PLZT plate 11 by entering the side of the PLZT plate 11 opposite to the islands 13 and grid pattern 12. The illumination light may enter either side of the PLZT plate for the charge beam addressed embodiment, but it is preferable to enter the side opposite to the islands for the photoconductor addressed embodiment as described hereinabove. The light emerging from the PLZT plate 11 passes through an analyzer 32 which is set at an angle of 90° (crossed) with respect to the polarizer 31. The use of crossed polarizers with a PLZT plate between is clearly disclosed in U.S. Pat. No. 3,612,656 the contents of which are incorporated herein by reference. The light emanating from the analyzer 32 may be viewed directly to view the image on the PLZT plate 11. Alternatively, the light emanating from the analyzer 32 may be projected onto a distant screen (not shown) by means of a projection lens (not shown).

The embodiment of the PLZT plate 11 illustrated in FIGS. 1A, 1B, and 1C may be imaged by scanning with an electron beam source 33, such as that disclosed in U.S. Pat. No. 3,702,215 by means of a suitable X and Y scanner 34 that may include electrostatic deflection plates. By modulating the intensity of the electron beam, the desired image can be formed on the PLZT plate 11 in a manner as described hereinabove. Alternatively, the electron beam can be utilized to erase all or a part of the image on the PLZT plate by using secondary emission effects as is well known in the art. When the PLZT plate 11 corresponds to that discussed hereinabove in conjunction with FIG. 2, the source 33 may include a source of radiation such as a laser which is caused to scan the PLZT plate 11 by suitable means such as an appropriate scanner 34 that may include rotatable mirrors. The laser beam may be utilized both to form images on the PLZT plate 11 and to partially or totally erase the images.

In the embodiments of the present invention described, the grid pattern 12 contains square openings 15 in which square islands 13 are deposited. As will be apparent, the present invention is not limited to this geometry. Rather, other geometric shapes can be utilized, both for the grid 12 openings 15 and the islands 13. FIGS. 4A through 4I illustrate a few of the almost limitless number and variety of geometric shapes which may be utilized to form the pixels 14 or image forming areas in the PLZT plate 11. As is shown in these Figures, the geometric shape of the island 13 does not necessarily have to correspond with the geometric shape of the opening 15 in the grid pattern 12. Although FIGS. 4A thru 4I illustrate only square, rectangular and circular patterns, it will be apparent to those skilled in the art that other patterns may be utilized and that more than one island 13 can be included within any one opening 15 in the grid pattern 12. The geometry selected for the islands 13 and the opening 15 in the grid pattern 12 will, to some extent, be determined by the nature of birefringence desired in the PLZT plate 11. For example, as the islands 13 are spaced closer to the grid pattern 12, the electrical charge on the islands 13 needed to produce a given amount of birefrigence is decreased. However, this also results in decreased transmission of the illumination 17 radiation through the pixels 14.

Figure 5A:
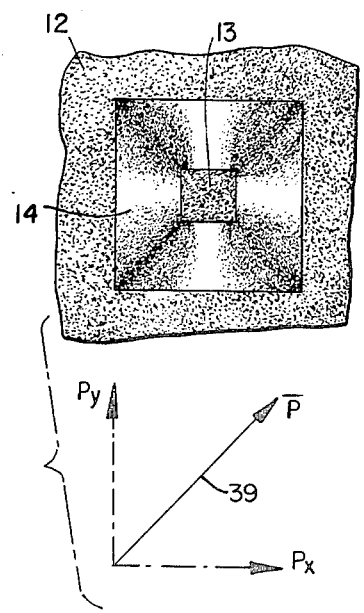
FIGS. 5A and 5B illustrate the birefringence affect achieved on a PLZT plate in accordance with one embodiment of the present invention.
Figure 5B:
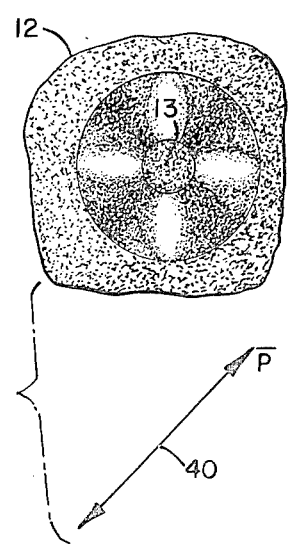

The nature of the birefrigence of a pixel 14 in an optical system as shown in FIG. 3 will become apparent from consideration of FIG. 5A wherein a square island 13 is shown disposed within a square opening 15 in the grid pattern 12. Once the island 13 is charged, electric field lines will exist between the boundaries of the island 13 and the adjacent portions of the grid pattern 12. These lines of force terminate in a direction that is perpendicular to the boundaries of the grid pattern 12 and the island 13. Assume that the incident illumination light is polarized along an axis 39 which makes an angle of 45° to the boundary of the grid 12 and island 13 as shown in FIG. 5B. The polarized light $\bar{p}$ has components Px and Py. In those regions of the open area 14 between the grid and island where the electric field is parallel to the direction of Px, the field induced decrease in the refractive index along the x direction will cause a relative retardation of the phase of Py and Px with respect to each other. This phase retardation will alter the polarization state of the transmitted light and therefore light will be transmitted through the crossed polarization analyzer 32. Similarly in those regions where the electric field is parallel to the direction of Py, the field induced decrease in the refractive index along the y direction will cause a relative phase retardation between Px and Py which results in transmitted light through the analyzer 32. In the vicinity of the corner of the open area 14 the electric field lines are mostly oriented at 45° to the x and y axes and the field induced decrease in index of refraction produces an equal effect on the phase of Px and Py with the result that no relative phase retardation occurs between Px and Py. Therefore, the polarization state of the incident illumination light is not altered in the corner and consequently no light is transmitted through the crossed analyzer in the corners.

The transparent areas in FIG. 5A are illustrated by a lack of shading while the opaque areas are indicated by the presence of shading. The areas of transparency and opaqueness will be relative opaque or transparent depending upon their nearness to the areas of transparency or opaqueness as shown.

FIG. 5B illustrates the light transmissability through a circular pixel 14 when the illumination light is polarized along a plane 40 lying at 45° to the horizontal and vertical axis of the circle. As shown by FIG. 5B, a maximum transmissability of light occurs along their vertical and horizontal axis of the circle whereas the pixel 14 is essentially opaque along lines that are at 45° to both the horizontal and vertical axis of the pixel 14.

The opaque portions of the pixels 14 can be substantially eliminated so that substantially all of the pixel 14 is transparent in the optical system illustrated in FIG. 3 by utilizing circularly polarized light. This is accomplished by adding a quarter wave retardation plate (not shown) following both the polarizer 31 and the analyzer 32, in a well known manner, so that the unpolarized light passing through the polarizer 31 is circularly polarized rather than being linearly polarized. For example, the incident vertically polarized illumination passes the $\frac{1}{4}\lambda$ retardation plate and becomes righthanded circularly polarized illumination light which enters the pixel 14 as shown in FIG. 3. The induced birefringence in the PLZT plate causes a half wave relative phase retardation of the two orthogonal components of the circularly polarized illumination light and results in the emergent light being circularly polarized with a reversed handedness, i.e., left-handed. The light passes through the final $\frac{1}{4}\lambda$ retardation plate which converts the left-handed circularly polarized light into horizontal linear polarization which is transmitted by the analyzer. In those pixels where no birefringence was induced, the emergent light remains right-handed, is converted to vertical polarization by the final $\frac{1}{4}\lambda$ retardation plate and is blocked by the crossed analyzer.

What is claimed is:

1. A flat electro-optical display panel comprising;
   a flat, optically birefringent transverse electroptic plate having first and second parallel surfaces,
   an electrically conductive coating having a plurality of openings therein on said first parallel surface, and
   islands of electrically conductive material electrically isolated from said conductive coating and disposed on said first parallel surface within at least some of said openings.

2. The display panel according to claim 1 further including;
   a transparent conductor covering said second parallel surface.

3. The display panel according to claim 1 wherein said electrically conductive coating is opaque.

4. The display panel according to claim 1 wherein said electrically conductive islands are opaque.

5. The display panel according to claim 1 wherein; said
   transverse electro-optic plate is fabricated from PLZT ceramic.

6. The display panel according to claim 1 wherein said PLZT
   ceramic plate is fabricated from lanthanum doped lead-zirconate and lead-titanate wherein said plate contains about 65% by weight of lead zirconate and about 35% by weight of lead-titanate and is doped with 9% by weight of lanthanum.

7. The display panel according to claim 1 wherein; said
   ceramic plate includes a fine grain polycrystalline ferroelectric ceramic.

8. The display panel according to claim 1 wherein; said
   ceramic plate includes a fine grain polycrystalline paraelectric ceramic.

9. The optical display panel according to claim 1 further including;
   a transparent photoconductive layer covering said electrically conductive coating and said electrically conductive islands.

10. The optical display panel according to claim 9 further including;
    a transparent conductor covering said photoconductive layer.

11. The method of forming an image on a flat PLZT panel having a plurality of electrically conductive islands surrounded by and electrically isolated from an electrically conducting grid pattern on one side thereof comprising the steps of;
    grounding said electrically conductive grid pattern and
    applying an electrical potential to selected ones of said islands.

12. The method according to claim 11 further including the step of;
    passing polarized viewing illumination through said flat PLZT panel.

13. The method according to claim 11 further including the steps of;
    placing the flat PLZT panel between two crossed polarizers, and
    subjecting said PLZT-cross-polarizer combination to viewing illumination.

14. The method according to claim 13 wherein the charging source is an electron beam.

15. The method according to claim 13 wherein the charging source is a plasma discharge.

16. The method according to claim 12 wherein said viewing illumination is circularly polarized.

17. The method according to claim 12 wherein said polarized illumination enters said PLZT panel on the side thereof opposite to said islands and said grid pattern.

18. The method according to claim 11 wherein;
    the image formed on said PLZT plate is erased by the steps of
    grounding said electrically conductively grid pattern, and
    applying an opposite charge to at least said selectively charged islands to enable said islands to discharge to ground potential.

19. The method according to claim 11 wherein the image formed on said PLZT plate is erased by:
    grounding said electrically conducting grid pattern, and
    applying an electrically conductive fluid to the face of said PLZT plate having said islands and said grid pattern to enable said charged islands to discharge to ground potential.

20. The method of forming an image on a PLZT plate having a plurality of electrically conductive islands thereon which are surrounded by and insulated from an electrically conducting grid pattern with said islands and grid pattern being covered by a transparent photoconductive layer and a transparent conductor layer comprising the steps of
    applying a potential to said transparent conductor,
    applying another potential to said electrically conductive grid pattern and
    selectively exposing selected ones of said islands to light radiation to enable said islands to charge toward the potential of said transparent conductor through the conductive path of said exposed photoconductor.

21. The method according to claim 20 wherein the image formed thereon is erased by;
grounding said grid pattern and said transparent layer, and
exposing at least some of said islands to light to enable said islands to discharge to ground potential.

22. The method of forming an image on a flat plate of PLZT material having a plurality of electrically conductive islands on one side thereof which are surrounded by an electrically conductive grid pattern comprising the steps of;
applying a potential to said grid pattern,
selectively charging at least some of said islands to another electrical potential, and
then grounding said electrically conductive grid pattern to enable at least some of the PLZT material located between said charged islands and said grid pattern to become birefringent.

23. The method according to claim 21 further including the step of;
passing polarized viewing illumination through said flat PLZT panel with said illumination entering said PLZT panel on the side thereof remote from said islands and grid pattern.

24. The method according to claim 23 wherein said viewing illumination is circularly polarized.

25. The method according to claim 23 further including the step of
placing said flat PLZT panel between a pair of crossed-polarizers before subjecting said PLZT panel to viewing illumination.

* * * * *